United States Patent
Dasanayake Aluthge et al.

(10) Patent No.: US 12,503,735 B2
(45) Date of Patent: Dec. 23, 2025

(54) SYSTEM AND METHOD FOR PRODUCING STEEL

(71) Applicant: SEKISUI CHEMICAL CO., LTD., Osaka (JP)

(72) Inventors: Rasika Dasanayake Aluthge, Ibaraki (JP); Katsuo Matsuzaka, Ibaraki (JP); Kenichi Shinmei, Ibaraki (JP); Yuki Nakama, Ibaraki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/277,971

(22) PCT Filed: Aug. 4, 2020

(86) PCT No.: PCT/JP2020/029823
§ 371 (c)(1),
(2) Date: Mar. 19, 2021

(87) PCT Pub. No.: WO2022/029887
PCT Pub. Date: Feb. 10, 2022

(65) Prior Publication Data
US 2022/0307096 A1 Sep. 29, 2022

(51) Int. Cl.
*C21B 5/06* (2006.01)
*C01B 32/40* (2017.01)
*C21B 7/00* (2006.01)

(52) U.S. Cl.
CPC ............ *C21B 5/06* (2013.01); *C01B 32/40* (2017.08); *C21B 7/002* (2013.01);
(Continued)

(58) Field of Classification Search
None
See application file for complete search history.

(56) References Cited

U.S. PATENT DOCUMENTS

| | | |
|---|---|---|
| 2016/0083810 A1 | 3/2016 | Kuhl |
| 2021/0009428 A1 | 1/2021 | Dasanayake Aluthge et al. |

FOREIGN PATENT DOCUMENTS

| | | |
|---|---|---|
| EP | 2 634 140 | 9/2013 |
| JP | 5640786 | 12/2014 |

(Continued)

OTHER PUBLICATIONS

Translation of WO 2012/017916 A1 (Feb. 9, 2012). (Year: 2012).*

(Continued)

*Primary Examiner* — Jennifer A Leung
(74) *Attorney, Agent, or Firm* — Wenderoth, Lind & Ponack, L.L.P.

(57) ABSTRACT

System and method for producing steel is provided that efficiently reduce carbon dioxide emissions. A steel production system includes: a first gas generating section configured to obtain a first gas by converting carbon monoxide, to carbon dioxide, in a gas containing the carbon dioxide and carbon monoxide; a reducing gas supply section 3 configured to supply a reducing gas containing a reducing substance to reduce a reducing agent, the reducing agent containing metal oxide to reduce carbon dioxide and being oxidized by contact with the carbon dioxide; and a reaction section 4 including a plurality of reactors 4a and 4b, respectively connected to at least one of the first gas generating section and the reducing gas supply section 3, and the reducing agent arranged in the reactors 4a and 4b, the reaction section being capable of switching between the first gas and the reducing gas to be supplied to each of the reactors 4a and 4b, wherein a second gas is configured to be supplied to a blast furnace, the second gas being obtained by contacting the first gas supplied to the reactors 4a and 4b with the reducing agent to convert the carbon dioxide to carbon monoxide and the second gas having the carbon monoxide as a main component.

14 Claims, 8 Drawing Sheets

(52) U.S. Cl.
CPC ...... *C21B 2100/22* (2017.05); *C21B 2100/28* (2017.05); *C21B 2100/282* (2017.05); *C21B 2100/40* (2017.05); *C21B 2100/64* (2017.05); *Y02P 10/122* (2015.11)

(56) References Cited

FOREIGN PATENT DOCUMENTS

| | | | |
|---|---|---|---|
| JP | 2016-524654 | | 8/2016 |
| KR | 20200055939 A | * | 5/2020 |
| WO | 2012/017916 | | 2/2012 |
| WO | 2019/163968 | | 8/2019 |

OTHER PUBLICATIONS

Extended European Search Report issued Nov. 17, 2022 in corresponding European Patent Application No. 20922473.2.

English language translation of International Search Report issued Sep. 8, 2020 in corresponding International (PCT) Patent Application No. PCT/JP2020/029823.

First Notice of Reasons for Refusal issued on Mar. 14, 2024, in corresponding Chinese Patent Application No. 202080018681.8, with English language translation.

Office Action issued Oct. 1, 2024 in corresponding Chinese patent application No. 202080018681.8, with English translation.

Decision on Rejection issued Feb. 27, 2025 in corresponding Chinese Patent Application No. 202080018681.8, with English translation.

* cited by examiner

SYSTEM AND METHOD FOR PRODUCING STEEL

TECHNICAL FIELD

The present invention relates to a system and method for producing steel.

BACKGROUND ART

In recent years, the concentration of carbon dioxide ($CO_2$) as a kind of greenhouse gas in the atmosphere has been continuously increasing. Such an increase in concentration of carbon dioxide in the atmosphere promotes global warming. It is thus important to capture carbon dioxide released into the atmosphere, and reuse of captured carbon dioxide by converting to valuable substances further allows achieving carbon circular economy.

There are global policies, such as the Kyoto Protocol to the United Nations Framework Convention on Climate Change, that commit state parties to accomplish a reduction target in a commitment period by defining a reduction of carbon dioxide causing global warming for each developed country with reference to the year 1990.

Since an exhaust gas containing carbon dioxide generated from a steelworks, a refinery, or a thermal power plant is subjected to the reduction, to reach the reduction target, various technical improvements are made on carbon dioxide reduction in these industries.

For example, PTL 1 proposes to perform the first separation operation of separating a blast furnace gas emitted from a blast furnace into carbon dioxide and carbon monoxide, perform the second separation operation of converting (reforming) separated carbon dioxide to carbon monoxide to obtain a reformed gas, followed by again separating the reformed gas into carbon dioxide and carbon monoxide, and join carbon monoxide separated by the first and second separation operations to blow in the blast furnace as a reducing agent.

CITATION LIST

Patent Literature

PTL 1: Japanese Patent No. 5640786

SUMMARY OF INVENTION

Technical Problem

However, according to investigations made by the inventors, the method described in PTL 1 has low energy efficiency because the separation operation is performed respectively for carbon dioxide and carbon monoxide by heating, cooling, and vacuuming.

It is thus an object of the present invention to provide a system and method for producing steel efficiently reducing carbon dioxide emissions.

Solution to Problem

Such an object is achieved by the following present invention.

(1) A steel production system of the present invention includes:
  a first gas generating section configured to obtain a first gas by converting carbon monoxide, in a gas containing the carbon dioxide and carbon monoxide to carbon dioxide;
  a reducing gas supply section configured to supply a reducing gas containing a reducing substance to reduce a reducing agent which contain metal oxide to reduce carbon dioxide and being oxidized by contact with the carbon dioxide; and
  a reaction section including a plurality of reactors, which are respectively connected to at least one of the first gas generating section and the reducing gas supply section, and in which the reducing agents are arranged, the reaction section being capable of switching between the first gas and the reducing gas to be supplied to each of the reactors or capable of moving transferring the reducing agent between the reactors, wherein
  a second gas is configured to be supplied to a melting furnace, the second gas which is obtained by contacting the first gas supplied to the reactors with the reducing agent to convert the carbon dioxide to carbon monoxide and has the carbon monoxide as a main component.

(2) In the steel production system of the present invention, it is preferred that the gas is an exhaust gas emitted from a furnace related to a steelworks or a refinery.

(3) The steel production system preferably further includes a concentration section arranged between the first gas generating section and the reaction section and configured to increase a concentration of the carbon dioxide contained in the first gas.

(4) In the steel production system of the present invention, it is preferred that the concentration of the carbon dioxide contained in the first gas emitted from the concentration section is 70 volume % or more based on a total of the first gas.

(5) In the steel production system of the present invention, it is preferred that the first gas generating section includes a combustion furnace configured to burn the gas.

(6) In the steel production system of the present invention, it is preferred that a concentration of the carbon monoxide contained in the second gas is 70 volume % or more based on a total of the second gas.

(7) The steel production system preferably further includes a second gas heating section configured to heat the second gas before supplied to the melting furnace.

(8) In the steel production system of the present invention, it is preferred that the second gas after heated by the second gas heating section has a temperature from 500° C. to 1300° C.

(9) The steel production system preferably further includes a first gas heating section configured to heat the first gas before supplied to the reactors.

(10) The steel production system preferably further includes a reducing gas heating section configured to heat the reducing gas before supplied to the reactors.

(11) In the steel production system of the present invention, it is preferred that relationship of $|X-Y|$ being 0 to 25 is satisfied when the first gas to be supplied to the reactors has a temperature of $X[° C.]$ and the reducing gas to be supplied to the reactors has a temperature of $Y[° C.]$.

(12) The steel production system preferably further includes a reducing agent temperature regulation section configured to regulate a temperature of the reducing agent during contact of the first gas or the reducing gas with the reducing agent.
(13) In the steel production system of the present invention, it is preferred that the reducing gas contains hydrogen as the reducing substance, and
the reducing gas supply section includes a hydrogen generator configured to generate the hydrogen by electrolysis of water or to generate by-product hydrogen as the hydrogen.
(14) In the steel production system of the present invention, it is preferred that the metal oxide contains at least one selected from metal elements belonging to the third through twelfth groups.
(15) The steel production system preferably further includes a purifier connected to a downstream side of each of the reactors, wherein
the purifier includes: a purifier body; and a separation tube arranged in the purifier body and capable of at least one of separation between the reducing substance and an oxide of the reducing substance generated by contact with the reducing agent and separation between the carbon monoxide and the carbon dioxide.
(16) A steel production method of the present invention includes:
preparing a plurality of reactors having a reducing agent which contain metal oxide to reduce carbon dioxide are arranged therein, the reducing agent, and a reducing gas containing a reducing substance to reduce the reducing agent oxidized by contact with the carbon dioxide;
obtaining a first gas by converting carbon monoxide in a gas containing carbon dioxide and the carbon monoxide to carbon dioxide;
converting the carbon dioxide to carbon monoxide by alternately contacting the first gas and the reducing gas with the reducing agent in each of the reactors, by switching the reactors supplied with the first gas and the reducing gas or moving the reducing agent between the reactors, to obtain a second gas having the carbon monoxide as a main component and also to reduce the oxidized reducing agent; and
supplying the second gas emitted from the reactors to a melting furnace.
(17) In the steel production method of the present invention, it is preferred that the gas is an exhaust gas emitted from a furnace related to a steelworks or a refinery.

Advantageous Effects of Invention

The present invention allows steel production while efficiently reducing carbon dioxide emissions.

DESCRIPTION OF EMBODIMENTS

Figure 1:
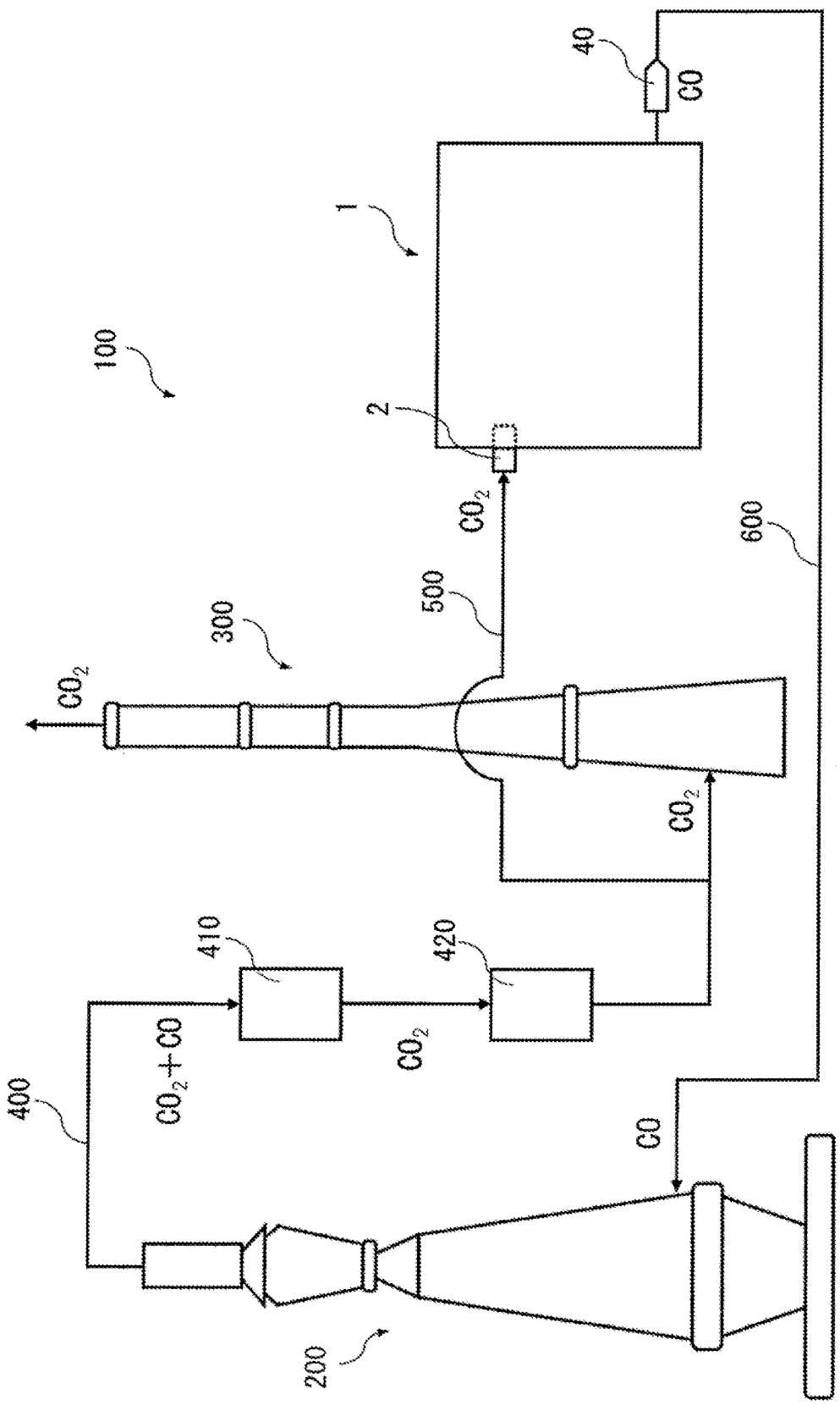
FIG. 1 is a schematic view illustrating an embodiment of a steel production system of the present invention.
Figure 2:
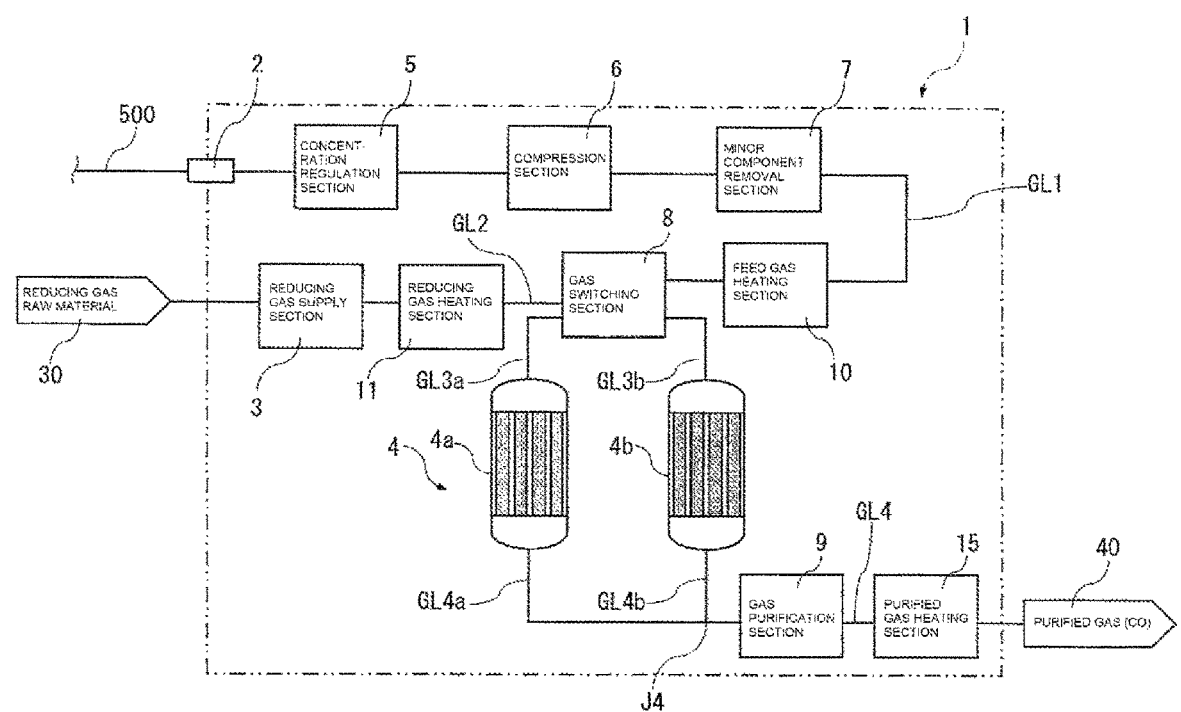
FIG. 2 is a schematic view illustrating an embodiment of a gas production apparatus in the steel production system of FIG. 1.
Figure 3:
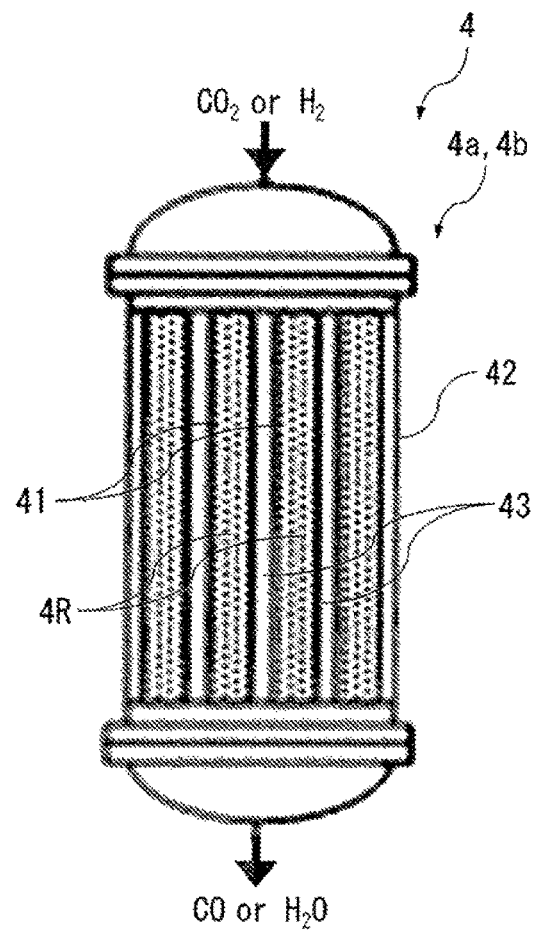
FIG. 3 is a cross-sectional view schematically illustrating a configuration of reactors in
FIG. 2.
Figure 4:
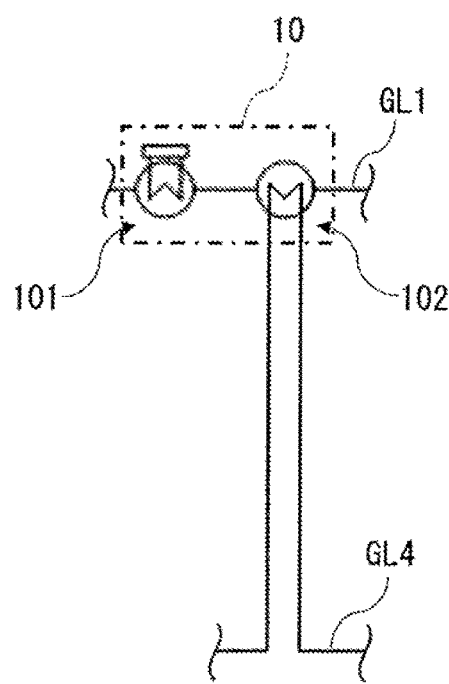
FIG. 4 is a schematic view illustrating a configuration of a feed gas heating section in FIG. 2.

A system and method for producing steel of the present invention are described below in detail based on preferred embodiments illustrated in the appended drawings.
Overall Configuration
FIG. 1 is a schematic view illustrating an embodiment of a steel production system of the present invention. FIG. 2 is a schematic view illustrating an embodiment of a gas production apparatus in the steel production system of FIG. 1. FIG. 3 is a cross-sectional view schematically illustrating a configuration of reactors in FIG. 2. FIG. 4 is a schematic view illustrating a configuration of a feed gas heating section in FIG. 2.

A steel production system 100 illustrated in FIG. 1 includes a blast furnace (melting furnace) 200, a smokestack 300, exhaust gas equipment having a gas line 400 connecting the blast furnace 200 and the smokestack 300, a supply line 500 branched from a point on the gas line 400, a gas production apparatus 1 connected to the supply line 500 via a connection section 2, and a return line 600 connecting the gas production apparatus 1 and the blast furnace 200.

It should be noted that an upstream side in the direction of gas flow may be referred to simply as an "upstream side" and a downstream side in this direction simply as a "downstream side".

The present embodiment is configured to use a gas emitted from the blast furnace 200 while the gas may be emitted from, for example, another furnace belonging to a steelworks or a refinery. Examples of another preferred furnace include a converter and the like. In such a furnace, an exhaust gas is produced (generated) during melting, refinement, and the like of the contents. The exhaust gas usually contains, in addition to carbon dioxide and carbon monoxide, other gas components, such as nitrogen, oxygen, steam, and methane.

The exhaust gas from such a blast furnace (blast furnace gas) is a gas generated during production of pig iron in the blast furnace and contains from 10 to 15 volume % of carbon dioxide, from 55 to 60 volume % of nitrogen, from 25 to 30 volume % of carbon monoxide, and from 1 to 5 volume % of hydrogen.

The exhaust gas from such a converter (converter gas) is a gas generated during production of steel in the converter and contains from 15 to 20 volume % of carbon dioxide, from 50 to 60 volume % of carbon monoxide, from 15 to 25 volume % of nitrogen, and from 1 to 5 volume % of hydrogen.

Use of such an exhaust gas allows effective use of carbon dioxide, which used to be emitted in the atmosphere, and reduction in environmental load.

At some points on the gas line 400, a first gas generating section 410 and a concentration section 420 are arranged as treaters in this order from the upstream side.

The first gas generating section 410 converts carbon monoxide in the blast furnace gas, containing carbon dioxide and the carbon monoxide, to carbon dioxide to generate a first gas.

The first gas generating section 410 may be configured by containing, for example, a combustion furnace (combustion boiler), a separator of low-temperature separation (cryogenic) process, a separator of pressure swing adsorption (PSA) process, a separator of membrane separation process, a separator of temperature swing adsorption (TSA) process, an amine absorption separator, an amine adsorption separator, or the like. Among them, the first gas generating section 410 is preferably configured with a combustion furnace to burn a blast furnace gas. Such a combustion furnace allows efficient conversion of carbon monoxide to carbon dioxide with relatively simple equipment. That is, use of the combustion furnace allows generation of the first gas with high energy efficiency.

When a blast furnace gas is burned in the combustion furnace, a first gas is generated that contains from 5 to 15 volume % of carbon dioxide, from 60 to 70 volume % of nitrogen, from 5 to 10 volume % of oxygen, and from 15 to 25 volume % of steam.

The concentration section 420 is arranged between the first gas generating section 410 and the gas production apparatus 1 (reaction section 4, described later) to increase the concentration of carbon dioxide contained in the first gas.

It should be noted that, depending on the configuration of the first gas generating section 410 and the like, the concentration of carbon dioxide contained in the first gas emitted from the first gas generating section 410 may be sufficiently high. In this case, the concentration section 420 may be omitted.

The concentration section 420 may be configured by containing, for example, a continuous separator of membrane separation process, a separator of membrane separation pressure swing adsorption (PSA) process, an amine absorption separator, an amine adsorption separator, or the like. Among them, the concentration section 420 is preferably configured with an amine absorption separator. Use of the amine absorption separator allows a sufficient increase in the concentration of concentrated carbon dioxide not to easily generate a by-product when carbon dioxide is converted to carbon monoxide in the reaction section 4.

The concentration of carbon dioxide contained in the first gas emitted from the concentration section 420 is preferably 70 volume % or more based on the total first gas, more preferably 80 volume % or more, even more preferably 90 volume % or more, and particularly preferably 95 volume % or more. This allows an increase in the production efficiency of a second gas having carbon monoxide as a main component in the gas production apparatus 1.

The upper limit of the concentration of carbon dioxide contained in the first gas may be 100 volume %, may be realistically 99 volume % or less, and may be 98 volume % or less. In this case, it is possible to produce the second gas without increasing the complexity of the configuration of the concentration section 420 and production costs for the apparatus.

The gas line 400 is connected to the smokestack 300 to release the first gas as an exhaust gas.

Between the concentration section 420 and the smokestack 300 at a point on the gas line 400, the supply line 500 is connected (branched) to the gas line 400.

It should be noted that piping configuring the gas line 400 is usually disposed (extended) in the horizontal direction (along the ground). In this case, piping configuring the supply line 500 is preferably disposed (extended) in a vertical direction and approximately orthogonal to the piping configuring the gas line 400. Even if condensed water is produced by cooling the first gas, such a configuration allows preventing the condensed water from mixing into the first gas extracted to the supply line 500.

Gas Production Apparatus

The gas production apparatus 1 produces the second gas (synthetic gas) having carbon monoxide as a main component by contacting the first gas (preferably, the first gas with a carbon dioxide concentration of 70 volume % or more) supplied via the supply line 500 and the connection section 2 with the reducing agent containing metal oxide to reduce carbon dioxide.

As illustrated in FIG. 2, the gas production apparatus 1 mainly has the connection section 2, a reducing gas supply section 3, two reactors 4a and 4b, a gas line GL1 connecting the connection section 2 and the respective reactors 4a and 4b, a gas line GL2 connecting the reducing gas supply section 3 and the respective reactors 4a and 4b, and a gas line GL4 connected to the respective reactors 4a and 4b.

In the present embodiment, the connection section 2 configures a gas supply section to supply the first gas to the reactors 4a and 4b.

It should be noted that a pump to transfer a gas may be arranged as needed in a predetermined position on the gas lines GL1, GL2, and GL4. For example, when the pressure of the first gas is regulated relatively low by a compression section 6 described later, a pump may be arranged to smoothly transfer the gas in the gas production apparatus 1.

The gas line GL1 has an end connected to the connection section 2. Meanwhile, the gas line GL1 has the other ends connected respectively to inlet ports of the reactors 4a and 4b provided in the reaction section 4 via a gas switching section 8 and two gas lines GL3a and GL3b.

Such a configuration allows the first gas supplied via the connection section 2 to pass through the gas line GL1 to be supplied to the respective reactors 4a and 4b.

The gas switching section 8 may be configured by containing, for example, a branched gas line and a channel opening/closing mechanism, such as a valve, provided at a point on the branched gas line.

As illustrated in FIG. 3, each of the reactors 4a and 4b is configured with a multitubular reactor (fixed-bed reactor) including a plurality of tubes 41, each filled with a reducing agent 4R, and a housing 42 containing the plurality of tubes 41. According to such a multitubular reactor, it is possible to sufficiently secure an opportunity to contact the reducing agent 4R with the first gas and the reducing gas. As a result, it is possible to increase the production efficiency of the second gas.

The reducing agent 4R in the present embodiment is preferably, for example, in particles (granules), flakes, pellets, and the like. The reducing agent 4R in such a form allows an increase in efficiency of filling in the tubes 41 and an even more increase in the contact area with the gas supplied to the tubes 41.

In the case of the reducing agent 4R in particles, the volume-average particle diameter is preferably, but not particularly limited to, from 1 to 50 mm and more preferably from 3 to 30 mm. This case allows a further increase in the contact area with the reducing agent 4R and the first gas (carbon dioxide) and more improvement in the conversion efficiency of carbon dioxide to carbon monoxide. Similarly, this allows more efficient recovery (reduction) of the reducing agent 4R by the reducing gas containing the reducing substance.

The reducing agent 4R is preferably shaped articles produced by oscillating granulation to increase the sphericity.

The reducing agent 4R may be carried by a carrier. The carrier may be composed of a material that is not particularly limited as long as the material is not easily modified by the first gas (exhaust gas), reaction conditions, and the like, and examples of the material include carbon materials (graphite, graphene, etc.), zeolite, montmorillonite, $SiO_2$, $ZrO_2$, $TiO_2$, $V_2O_5$, MgO, alumina ($Al_2O_3$), silica, complex oxide of these materials, and the like. Among them, zeolite, montmorillonite, $SiO_2$, $ZrO_2$, $TiO_2$, $V_2O_5$, MgO, alumina ($Al_2O_3$), silica, and complex oxides of these materials are preferred. The carrier composed of such a material is preferred for not negatively affecting reaction of the reducing agent 4R and having an excellent capability of carrying the reducing agent 4R. In this situation, the carrier does not participate in the reaction of the reducing agent 4R and simply supports (holds) the reducing agent 4R. Examples of such an embodiment include a configuration of coating at least part of the carrier surface with the reducing agent 4R.

The metal oxide (oxygen carrier) contained in the reducing agent 4R is not particularly limited as long as it is capable of reducing carbon dioxide, and the metal oxide preferably contains at least one selected from metal elements belonging to the third through twelfth groups, more preferably contains at least one selected from metal elements belonging to the fourth through twelfth groups, even more preferably contains at least one of titanium, vanadium, iron, copper, zinc, nickel, manganese, chromium, cerium, and the like, and particularly preferably metal oxide or complex oxide containing iron. These metal oxides are useful for having particularly good conversion efficiency of carbon dioxide to carbon monoxide.

In each of the reactors 4a and 4b, the tubes (cylindrically shaped articles) 41 may be produced from the reducing agent 4R (metal oxide) itself. Moreover, shaped articles in a block form, a lattice form (e.g., mesh, honeycomb), and the like may be produced by the reducing agent 4R to be arranged in the housing 42. In these cases, the reducing agent 4R as a filler may be omitted or used in combination.

Among them, a configuration is preferred in which mesh structures are produced with the reducing agent 4R and arranged in the housing 42. In such a configuration, it is also possible to sufficiently secure an opportunity to contact the reducing agent 4R with the first gas and the reducing gas while preventing an increase in transmission resistance of the first gas and the reducing gas in the respective reactors 4a and 4b.

It should be noted that the two reactors 4a and 4b are set to have a volume approximately equal to each other, which is appropriately set in accordance with the amount of the first gas to be treated (the size of the furnace and the size of the gas production apparatus 1).

In order from the connection section 2 side at some points on the gas line GL1, a concentration regulation section (separation and capture section) 5, the compression section 6, a minor component removal section 7, and a feed gas heating section (first gas heating section) 10 are provided.

The concentration regulation section 5 regulates the concentration of carbon dioxide contained in the first gas to be increased (in other words, carbon dioxide to be concentrated). The first gas also contains unwanted gas components, such as oxygen. The increase in the concentration of carbon dioxide contained in the first gas by the concentration regulation section 5 allows the concentration of the unwanted gas components contained in the first gas to be relatively lowered. It is thus possible to prevent or suppress negative influence by the unwanted gas components on the conversion efficiency of carbon dioxide to carbon monoxide by the reducing agent 4R.

The concentration regulation section 5 is preferably configured with a deoxidization device to remove oxygen contained in the first gas. This allows reduction in the amount of oxygen brought into the gas production apparatus 1 (i.e., the concentration of oxygen contained in the first gas to be regulated to be low). It is thus possible to deviate gas composition of the first gas from the explosive range to prevent ignition of the first gas. It should be noted that, since the electrical energy consumption of the deoxidization device is large among the gas production apparatus 1, it is effective to use electric power in the form of renewable energy as described later.

In this case, the concentration of oxygen contained in the first gas is preferably regulated to less than 1 volume % based on the total first gas, more preferably regulated to less than 0.5 volume %, and even more preferably regulated to less than 0.1 volume %. This allows more secure prevention of ignition of the first gas.

The deoxidization device to remove oxygen contained in the first gas may be configured using one or more of a separator of low-temperature separation (cryogenic) process, a separator of pressure swing adsorption (PSA) process, a separator of membrane separation process, a separator of temperature swing adsorption (TSA) process, a chemical absorption separator, a chemical adsorption separator, and the like.

It should be noted that the concentration regulation section 5 may regulate the concentration of carbon dioxide to be high by adding carbon dioxide to the first gas.

The compression section 6 increases the pressure of the first gas before supplied to the reactors 4a and 4b. This allows an increase in the amount of the first gas allowed to be treated by the reactors 4a and 4b in one time. It is thus possible to more improve the conversion efficiency of carbon dioxide to carbon monoxide by the reactors 4a and 4b.

Such a compression section 6 may be configured by: for example, a turbo compressor, such as a centrifugal compressor and an axial-flow compressor; a volume compressor, such as a reciprocating compressor, a diaphragm compressor, a single-screw compressor, a s twin-crew compressor, a scroll compressor, a rotary compressor, a rotary piston compressor, and a sliding vane compressor; a roots blower (two-lobe rotary blower) capable of operation at low pressures, a centrifugal blower, or the like.

Among them, the compression section 6 is preferably configured with a centrifugal compressor from the perspective of the ease of increasing the scale of the steel production system 100, and preferably configured with a reciprocating compressor from the perspective of reducing the production costs for the steel production system 100.

The first gas after passing through the compression section 6 preferably has a pressure, but not particularly limited to, from 0 to 1 MPaG, more preferably from 0 to 0.5 MPaG, and even more preferably from 0.01 to 0.5 MPaG. In this case, it is possible to further improve the conversion efficiency of carbon dioxide to carbon monoxide by the reactors 4a and 4b without increasing the pressure resistance of the gas production apparatus 1 more than necessary.

The minor component removal section 7 removes minor components (small amounts of unwanted gas components, etc.) contained in the first gas.

Such a minor component removal section 7 may be configured with at least one treater of, for example, a gas-liquid separator, a guard reactor, and a scrubber (absorption column).

When a plurality of treaters are used, the order of their arrangement is arbitrary. Meanwhile, when a gas-liquid separator and a guard reactor are used in combination, the gas-liquid separator is preferably arranged on an upstream side from the guard reactor. In this case, it is possible to more increase the removal efficiency of the minor components from the first gas and also to extend the usable years (lifetime) of the guard reactor.

The gas-liquid separator separates, for example, condensed water (liquid) produced during compression of the first gas by the compression section 6 from the first gas. In this case, unwanted gas components and the like remaining in the first gas are also dissolved in the condensed water to be removed.

The gas-liquid separator may be configured with, for example, a mere container, a swirl flow separator, a centrifugal separator, a surface tension separator, or the like. Among them, the gas-liquid separator is preferably configured with a mere container for the simple configuration, inexpensiveness, and the like. In this case, a filter may be arranged on the gas-liquid interface in the container to allow passage of gas but to block passage of liquid.

In this case as well, at the bottom of the container, a liquid line may be connected to provide a valve at a point on the line. Such a configuration allows emission of the condensed water stored in the container outside the gas production apparatus 1 via the liquid line by opening the valve.

It should be noted that the liquid line may be connected to a tank 30 described later to reuse the emitted condensed water.

The first gas after removing the condensed water by the gas-liquid separator may be configured to be supplied to, for example, a guard reactor.

Such a guard reactor preferably includes a substance capable of capturing a minor component contained in the first gas that is a component (inactivation component) to reduce the activity of the reducing agent 4R by contact with the reducing agent 4R.

According to such a configuration, when the first gas passes through the guard reactor, the substance in the guard reactor can react with (capture) the inactivation component to block or inhibit the substance from reaching the reducing agent 4R in the reactors 4a and 4b for protection (i.e., prevention of reduction in activity). It is thus possible to prevent or suppress extreme reduction in the conversion efficiency of carbon dioxide to carbon monoxide by the reducing agent 4R due to the negative influence of the inactivation component.

As such a substance, it is possible to use a substance having composition contained in the reducing agent 4R and composition to reduce the activity of the reducing agent 4R by contact with the inactivation component, specifically the same or similar metal oxide to the metal oxide contained in the reducing agent 4R. In this context, the similar metal oxide means metal oxide having the same metal element contained therein but having different composition or metal oxide having a metal element contained therein of a different kind but belonging to the same group in the periodic table of elements.

Such an inactivation component is preferably at least one selected from sulfur, mercury, sulfur compounds, halogen compounds, organic silicone, organic phosphorus, and organic metal compounds, and more preferably at least one selected from sulfur and sulfur compounds. Removal of such an inactivation component in advance allows preventing rapid reduction in the activity of the reducing agent 4R.

It should be noted that the above substance may be a substance to reduce its activity by the same component as the inactivation component of the reducing agent 4R and is preferably metal oxide, such as iron oxide and zinc oxide, for the excellent capability of capturing the inactivation component.

The guard reactor may have a configuration of arranging a mesh element in a housing to place particles of the above substance on the mesh element, a configuration of arranging a honeycomb filter member composed of the substance or a cylindrical or particulate shaped article in the housing, and the like.

In particular, when the guard reactor is arranged between the compression section 6 (gas-liquid separator) and the feed gas heating section 10, it is possible to improve the removal efficiency of the inactivation component while preventing degradation due to the heat of the substance.

The feed gas heating section 10 heats the first gas before supplied to the reactors 4a and 4b. Heating of the first gas before reaction (before reduction) in advance by the feed gas heating section 10 allows more acceleration of conversion (reduction) reaction of carbon dioxide to carbon monoxide by the reducing agent 4R in the reactors 4a and 4b.

As illustrated in FIG. 4, the feed gas heating section 10 may be configured with, for example, an electric heater 101 and a heat exchanger (economizer) 102.

The heat exchanger 102 is configured by bending part of the piping configuring the gas line GL4 (refer to the description later) to emit the gas (mixed gas) after passing through the reactors 4a and 4b and bringing it close to the piping configuring the gas line GL1. Such a configuration allows effective use of heat by heating the first gas before supplied to the reactors 4a and 4b by heat exchange using the heat of the gas (mixed gas) at high temperatures after passing through the reactors 4a and 4b.

Such a heat exchanger 102 may be configured as, for example, a jacket heat exchanger, an immersion coil heat exchanger, a double pipe heat exchanger, a shell and tube heat exchanger, a plate heat exchanger, a spiral heat exchanger, or the like.

In the feed gas heating section 10, either one of the electric heater 101 and the heat exchanger 102 may be omitted.

In the feed gas heating section 10, a combustion furnace or the like may be used instead of the electric heater 101. However, use of the electric heater 101 allows use of electric power (electrical energy) in the form of renewable energy as a power source for reduction in environmental load.

As the renewable energy, it is possible to use electrical energy using at least one selected from solar power generation, wind power generation, hydroelectric power generation, wave activated power generation, tidal power generation, biomass power generation, geothermal power generation, solar heat, and geothermal heat.

On the upstream side of the feed gas heating section 10 (e.g., between the gas-liquid separator and the guard reactor within the minor component removal section 7), an exhaust gas line may be branched from the gas line GL1 and have an end connected to a vent section provided outside the gas production apparatus 1.

In this case, a valve is preferably provided at a point on the exhaust gas line.

If the pressure in the gas production apparatus 1 (gas line GL1) increases more than necessary, the valve is opened to emit (release) part of the first gas from the vent section via the exhaust gas line. It is thus possible to prevent damage due to an increase in the pressure in the gas production apparatus 1.

The gas line GL2 has an end connected to the reducing gas supply section 3. Meanwhile, the gas line GL2 is connected respectively to inlet ports of the reactors 4a and 4b provided in the reaction section 4 via the gas switching section 8 and two gas lines GL3a and GL3b.

The reducing gas supply section 3 supplies the reducing gas containing the reducing substance to reduce the reducing agent 4R that is oxidized by contact with carbon dioxide. The reducing gas supply section 3 in the present embodiment is configured with a hydrogen generator to generate hydrogen by electrolysis of water, and the hydrogen generator is connected to a tank (reducing gas raw material storage section) 30, in which water is stored, outside the gas production apparatus 1. Such a configuration causes the reducing gas containing hydrogen (reducing substance) supplied from the hydrogen generator (reducing gas supply section 3) to pass through the gas line GL2 and to be supplied to the respective reactors 4a and 4b.

The hydrogen generator allows relatively inexpensive and convenient generation of a large amount of hydrogen. It also has an advantage of allowing reuse of the condensed water generated in the gas production apparatus 1. It should be noted that, since the electrical energy consumption of the hydrogen generator is large among the gas production apparatus 1, it is effective to use electric power in the form of renewable energy as described above.

It should be noted that, as the hydrogen generator, an apparatus for by-product hydrogen generation may be used. In this case, a reducing gas containing by-product hydrogen is supplied to the respective reactors 4a and 4b. Examples of the apparatus for by-product hydrogen generation include an apparatus for electrolysis of an aqueous sodium chloride solution, an apparatus for steam reforming of petroleum, an apparatus for ammonia production, and the like.

The gas line GL2 may be connected to a coke oven outside the gas production apparatus 1 via the connection section 2 to use an exhaust gas from the coke oven as the reducing gas. In this case, the connection section 2 configures the reducing gas supply section. This is because the exhaust gas from the coke oven has hydrogen and methane as main components and contains from 50 to 60 volume % of hydrogen.

At a point on the gas line GL2, a reducing gas heating section 11 is provided. The reducing gas heating section 11 heats the reducing gas before supplied to the reactors 4a and 4b. Heating of the reducing gas before reaction (before oxidation) in advance by the reducing gas heating section 11 allows more acceleration of reduction (recovery) reaction of the reducing agent 4R by the reducing gas in the reactors 4a and 4b.

The reducing gas heating section 11 may be configured in a similar manner to the feed gas heating section 10. The reducing gas heating section 11 is preferably configured with only an electric heater, only a heat exchanger, or a combination of an electric heater with a heat exchanger, and more preferably configured with only a heat exchanger or a combination of an electric heater with a heat exchanger.

The reducing gas heating section 11 including such a heat exchanger allows effective use of heat by heating the reducing gas before supplied to the reactors 4a and 4b by heat exchange using the heat of the gas (e.g., mixed gas) at high temperatures after passing through the reactors 4a and 4b.

According to the configuration as above, by switching the gas line (channel) in the gas switching section 8, it is possible to for example, supply the first gas via the gas line GL3a to the reactor 4a containing the reducing agent 4R before oxidation and supply the reducing gas via the gas line GL3b to the reactor 4b containing the reducing agent 4R after oxidation. During this operation, reaction of Expression 1 below proceeds in the reactor 4a and reaction of Expression 2 below proceeds in the reactor 4b.

It should be noted that Expressions 1 and 2 below show an example of the case where the metal oxide contained in the reducing agent 4R is iron oxide ($FeO_{x-1}$).

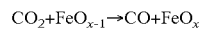

$$CO_2 + FeO_{x-1} \rightarrow CO + FeO_x \qquad \text{Expression 1:}$$

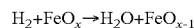

$$H_2 + FeO_x \rightarrow H_2O + FeO_{x-1} \qquad \text{Expression 2:}$$

Then, by switching the gas line in the opposite direction to above in the gas switching section 8, the reaction of Expression 2 above can proceed in the reactor 4a and the reaction of Expression 1 above can proceed in the reactor 4b.

It should be noted that both reactions indicated by Expressions 1 and 2 above are endothermic reactions. The gas production apparatus 1 thus preferably further includes a reducing agent heating section (now shown in FIG. 2) to heat the reducing agent 4R during contact of the reducing agent 4R with the first gas or the reducing gas (i.e., during reaction of the reducing agent 4R with the first gas or the reducing gas).

By providing such a reducing agent heating section, it is possible to maintain the temperature during the reaction of the reducing agent 4R with the first gas or the reducing gas at high temperatures to preferably prevent or suppress the reduction in the conversion efficiency of carbon dioxide to carbon monoxide and also further accelerate the recovery of the reducing agent 4R by the reducing gas.

However, depending on the kind of reducing agent 4R, the reactions indicated by Expressions 1 and 2 above may be exothermic reactions. In this case, the gas production apparatus 1 preferably has, instead of the reducing agent heating section, a reducing agent cooling section to cool the reducing agent 4R. By providing such a reducing agent cooling section, it is possible to preferably avoid the degradation of the reducing agent 4R during the reaction of the reducing agent 4R with the first gas or the reducing gas to preferably prevent or suppress the reduction in the conversion efficiency of carbon dioxide to carbon monoxide and also further accelerate the recovery of the reducing agent 4R by the reducing gas.

That is, the gas production apparatus 1 preferably includes a reducing agent temperature regulation section to regulate the temperature of the reducing agent 4R depending on the different kind (exothermic reaction or endothermic reaction) of reducing agent 4R.

It should be noted that preferred configurations of the reducing agent temperature regulation section are described later in detail.

The concentration of carbon monoxide contained in the second gas to be generated (gas after passing through the reactors 4a and 4b) is preferably 70 volume % or more based on the total second gas, more preferably 80 volume % or more, and even more preferably 90 volume % or more. This allows production of a purified gas with a sufficiently high concentration of carbon monoxide even when a gas purification section 9 described later has a simplified configuration.

It should be noted that the upper limit of the concentration of carbon monoxide contained in the second gas may be 100 volume %, but is realistically 95 volume % or less. In this case, it is possible to generate the second gas without increasing the complexity of the configuration of the reactors 4a and 4b or the production costs for the reactors 4a and 4b.

The reactors 4a and 4b has outlet ports respectively connected to branched gas lines GL4a and GL4b, which join at a gas joint section J4 to configure the gas line GL4. At some points on the branched gas lines GL4a and GL4b, respective valves (not shown) are provided as needed.

For example, by regulating the degree of valve opening, it is possible to set the passage rate of the first gas and the reducing gas passing through the reactors 4a and 4b (i.e., the treatment rate of the first gas by the reducing agent 4R and the treatment rate of the reducing agent 4R by the reducing gas).

In the present embodiment, the reaction section 4 is configured with the reactors 4a and 4b and the gas switching section 8.

Such a configuration causes the gases after passing through the respective reactors 4a and 4b (in the present embodiment, mainly steam and the second gas having carbon monoxide as a main component) to join at the gas joint section J4 to be mixed, and a mixed gas (joint gas) is thus generated to pass through the one gas line GL4.

It is thus possible to continuously produce the mixed gas by changing the channel switching state (state of valve opening/closing) of the gas switching section 8 for different reactions in the respective reactors 4a and 4b, and it is finally possible to continuously produce the purified gas. Since the same reactions are alternately and repeatedly performed in the reactors 4a and 4b, it is also possible to stabilize the concentration of carbon monoxide contained in the mixed gas, and as a result, stabilize the concentration of carbon monoxide contained in the purified gas.

Accordingly, the gas production apparatus 1 (steel production system 100) described above is capable of continuously and stably producing carbon monoxide from carbon dioxide and thus is industrially advantageous. It is also capable of steel production while efficiently reducing carbon dioxide emissions.

In contrast, in the case of not providing the gas joint section J4, the gas switching section 8 has to be blocked (temporarily close the valve) for switching the gases to be supplied, and the respective reactors 4a and 4b have to be batch reactors. Depending on the concentration of carbon dioxide in the first gas, the kind of reducing agent 4R, the capacity of the reactors 4a and 4b, and the like, the production of carbon monoxide thus takes longer time, sometimes causing poor conversion efficiency and an industrial disadvantage.

In addition, the components of the gases emitted from the respective reactors 4a and 4b are likely to vary every time the supplied gases are switched. It may thus cause complexity of after-treatment procedures of the gases emitted from the respective reactors 4a and 4b.

Generally, in this situation, the concentration of carbon monoxide contained in the mixed gas is preferably regulated within a specific range (predetermined volume % based on the total mixed gas). When the concentration is too low, it is likely to be difficult to obtain the purified gas containing a high concentration of carbon monoxide although it depends on the performance of the gas purification section 9 described later. Meanwhile, even when the concentration is increased above the upper limit, no further increase is expected in the effect of increasing the concentration of carbon monoxide contained in the purified gas to be finally obtained.

The gas line GL4 has an end, on the opposite side to the reactors 4a and 4b, connected to a purified gas emission section 40 to emit the purified gas outside the gas production apparatus 1. The purified gas emission section 40 and the blast furnace 200 are connected via the return line 600. Such a configuration allows the purified gas to be supplied to the blast furnace 200.

At some points on the gas line GL4, the gas purification section 9 and a purified gas heating section 15 provided in this order from the upstream side.

In the gas purification section 9, carbon monoxide is purified from the mixed gas to capture the purified gas containing a high concentration of carbon monoxide. It should be noted that, when the concentration of carbon monoxide in the mixed gas is sufficiently high, the gas purification section 9 may be omitted.

Such a gas purification section 9 may be configured with at least one treater of, for example, a condenser, a gas-liquid separator, a gas separator, a separation membrane, and a scrubber (absorption column).

When a plurality of treaters are used, the order of their arrangement is arbitrary. Meanwhile, when a condenser, a gas-liquid separator, and a gas separator are used in combination, they are preferably arranged in this order. In this case, it is possible to more increase the purification efficiency of carbon monoxide from the mixed gas.

The condenser cools the mixed gas. The condensed water (liquid) is thus generated.

Such a condenser has a configuration similar to the reactors 4a and 4b (refer to FIG. 3), which are jacket cooling systems having jackets to pass coolants arranged around the piping, and may be configured by containing a multitubular cooling system to pass the mixed gas in the tubes and a coolant around the tubes, an air fin cooler, and the like.

The gas-liquid separator separates condensed water (liquid) produced during cooling of the mixed gas by the condenser from the mixed gas. During this operation, the condensed water has an advantage of allowing the unwanted gas components (in particular, carbon dioxide) remaining in the mixed gas to be dissolved and removed. The gas-liquid separator may be configured in a similar manner to the gas-liquid separator in the minor component removal section 7 and is preferably configured with a mere container. In this case, a filter may be arranged on the gas-liquid interface in the container to allow passage of gas but to block passage of liquid.

In this case as well, at the bottom of the container, a liquid line may be connected to provide a valve at a point on the line. Such a configuration allows emission (release) of the condensed water stored in the container outside the gas production apparatus 1 via the liquid line by opening the valve.

At a point on the downstream side from the valve on the liquid line, a drain trap is preferably provided. Even if carbon monoxide and hydrogen leak into the liquid line due to malfunction of the valve, they are stored in the drain trap and it is thus possible to prevent emission outside the gas production apparatus 1. Instead of or together with the drain trap, a valve malfunction detection function and a redundancy system for valve malfunction may be provided.

It should be noted that the liquid line may be connected to the tank 30 described above to reuse the emitted condensed water.

The gas separator may be configured using one or more of, for example, a separator of low-temperature separation (cryogenic) process, a separator of pressure swing adsorption (PSA) process, a separator of membrane separation process, a separator of temperature swing adsorption (TSA) process, a separator using a porous coordination polymer (PCP) obtained by complexing metal ions (e.g., copper ions) and organic coordination ligands (e.g., 5-azidoisophthalic acid), a separator using amine absorption, and the like.

Between the gas-liquid separator and the gas separator on the gas line GL4, a valve may be provided. In this case, the degree of valve opening may be regulated to adjust the treatment rate of the mixed gas (production rate of the purified gas).

In the present embodiment, the concentration of carbon monoxide contained in the mixed gas emitted from the gas-liquid separator is from 75 to 100 volume % based on the total mixed gas.

When the purified gas is returned to the blast furnace (melting furnace) 200 to be used as a reducing agent as in the present embodiment, carbon monoxide is purified from the mixed gas to obtain a purified gas containing a high concentration of carbon monoxide.

Although the present embodiment is configured to return the purified gas to the same blast furnace 200, which is the blast furnace 200 from where the blast furnace gas is captured, the purified gas may be returned to a blast furnace different from the blast furnace 200 or may be returned to an electric furnace (another melting furnace).

The gas joint section J4 may be omitted to configure the branched gas lines GL4a and GL4b as independent gas lines. In this case, the gases (water or the second gas) after passing through the respective reactors 4a and 4b are transferred through the branched gas lines GL4a and GL4b independent from each other. For example, a gas containing water (steam) is subjected to disposal or conversion treatment to the tank 30, and the second gas having carbon monoxide as a main component passes through the gas purification section 9 and then emitted to the return line 600 via the purified gas emission section 40. Such a configuration allows treatment of the gases after passing through the respective reactors 4a and 4b independently from each other.

The purified gas heating section (second gas heating section) 15 heats the purified gas captured in the gas purification section 9 (in the case of omitting the gas joint section J4, the second gas emitted from the respective reactors 4a and 4b or the second gas after passing through the gas purification section 9). That is, the purified gas (second gas) before being returned (supplied) to the blast furnace 200 is heated. The purified gas is blown in the blast furnace 200 and it is thus possible to preferably prevent a decrease in the temperature during steel production causing reduction in the steel production efficiency and an increase in the content of impurities.

The purified gas heating section 15 may be configured with, for example, an electric heater, a combustion furnace (combustion boiler), a heat exchanger using a high temperature heat medium, an economizer (heat reclaim device), and the like.

The purified gas (second gas) after heated by the purified gas heating section 15 preferably has a temperature from 500° C. to 1300° C., and more preferably from 900° C. to 1200° C. In this case, it is possible to more increase the above effects.

A description is then given to a method (action) for using the steel production system 100.

[1] First, the gas line (channel) is switched in the gas switching section 8 to communicate the connection section 2 with the reactor 4a and to communicate the reducing gas supply section 3 with the reactor 4b.

[2] Then, in this state, the first gas having carbon dioxide as a main component is started to be suppled from the blast furnace 200 via the gas line 400, the supply line 500, and the connection section 2.

The first gas supplied from the connection section 2 usually has a high temperature from 50° C. to 300° C. and is cooled from 30° C. to 50° C. until reaching the concentration regulation section 5.

[3] The first gas then passes through the deoxidization device (concentration regulation section 5). Thus, oxygen is removed from the first gas and the concentration of carbon dioxide contained in the first gas increases.

[4] The first gas then passes through the compression section 6. The pressure of the first gas thus increases.

[5] The first gas then passes through the minor component removal section 7. The condensed water and the inactivation component are thus removed from the first gas, the condensed water being produced during compression of the first gas by the compression section 6 and the inactivation component reducing the activity of the reducing agent 4R.

[6] The first gas then passes through the feed gas heating section 10. The first gas is thus heated.

[7] The first gas is then supplied to the reactor 4a. In the reactor 4a, carbon dioxide in the first gas is reduced (converted) to carbon monoxide by the reducing agent 4R to obtain the second gas having carbon monoxide as a main component. During this operation, the reducing agent 4R is oxidized.

The heating temperature of the first gas in [6] above (temperature of the first gas to be supplied to the reactors 4a and 4b) is preferably from 300° C. to 700° C., more preferably from 450° C. to 700° C., even more preferably from 600° C. to 700° C., and particularly preferably from 650° C. to 700° C. By setting the heating temperature of the first gas within the above range, it is possible to prevent or suppress, for example, the rapid temperature decrease of the reducing agent 4R due to the endothermic reaction when carbon dioxide is converted to carbon monoxide and thus the reduction reaction of carbon dioxide can more smoothly proceed in the reactor 4a.

[8] In parallel with [2] through [7] above, water (reducing gas raw material) is supplied from the tank 30 to the hydrogen generator (reducing gas supply section 3) to generate hydrogen from water.

[9] The reducing gas containing hydrogen then passes through the reducing gas heating section 11. The reducing gas is thus heated.

[10] The reducing gas is then supplied to the reactor 4b. In the reactor 4b, the reducing agent 4R in the oxidized state is reduced (recovered) by the reducing gas (hydrogen).

The heating temperature of the reducing gas in [9] above (temperature of the reducing gas to be supplied to the reactors 4a and 4b) is preferably from 300° C. to 700° C., more preferably from 450° C. to 700° C., even more preferably from 600° C. to 700° C., and particularly preferably from 650° C. to 700° C. By setting the heating temperature of the reducing gas within the above range, it is possible to prevent or suppress, for example, the rapid temperature decrease of the reducing agent 4R due to the endothermic reaction when the reducing agent 4R in the oxidized state is reduced (recovered) and thus the reduction reaction of the reducing agent 4R can more smoothly proceed in the reactor 4b.

In this situation, when the heating temperature of the first gas by the feed gas heating section 10 is X[° C.] and the heating temperature of the reducing gas by the reducing gas heating section 11 is Y[° C.], relationship of |X−Y| (i.e., the absolute value of a difference between X and Y) being 0 to 25 is preferably satisfied, the relationship being 0 to 20 is more preferably satisfied, and the relationship being 0 to 15 is even more preferably satisfied. In other words, the heating temperature X of the first gas and the heating temperature Y of the reducing gas may be the same or slightly different. By setting X and Y to satisfy the above relationship, the conversion of carbon dioxide to carbon monoxide and the reduction of the reducing agent 4R by the reducing gas proceed in good balance.

It should be noted that, when the heating temperature X of the first gas and the heating temperature Y of the reducing gas are different, the heat quantity for the reduction reaction of the reducing agent 4R by the reducing gas tends to be greater than the heat quantity for the reduction reaction of carbon dioxide by the reducing agent 4R, and thus the heating temperature Y of the reducing gas is preferably set higher than the heating temperature X of the first gas.

In the present embodiment, timing for switching the gas lines (i.e., timing for switching the first gas and the reducing gas to be supplied to the reactors 4a and 4b) in the gas switching section 8 is preferably: Condition I—when a predetermined amount of the first gas is supplied to the reactor 4a or 4b; or Condition II—when the conversion efficiency of carbon dioxide to carbon monoxide falls below a predetermined value. This causes the reactors 4a and 4b to be switched before the conversion efficiency of carbon dioxide to carbon monoxide is greatly reduced, and it is thus possible to increase and stabilize the concentration of carbon monoxide contained in the mixed gas.

It should be noted that, for detection of Condition II, gas concentration sensors may be arranged respectively around the inlet and outlet ports of the reactors 4a and 4b. Based on the detected values by the gas concentration sensors, it is possible to obtain, by calculation, the conversion efficiency of carbon dioxide to carbon monoxide.

From the perspective of more stabilizing the concentration of carbon monoxide contained in the mixed gas, the amount of the supplied first gas to the reactors 4a and 4b and the amount of the supplied reducing gas to the reactors 4a and 4b are preferably set to be as close as possible. Specifically, when the amount of the supplied first gas to the reactors 4a and 4b is P [mL/min.] and the amount of the supplied reducing gas to the reactors 4a and 4b is Q [mL/min.], relationship of P/Q being 0.9 to 2 is preferably satisfied and the relationship being 0.95 to 1.5 is more preferably satisfied. When the amount P of the supplied first gas is too large, depending on the amount of the reducing agent 4R in the reactors 4a and 4b, the amount of carbon dioxide emitted from the reactors 4a and 4b without being converted to carbon monoxide tends to increase.

As the predetermined amount in Condition I above, the amount of carbon dioxide is preferably from 0.01 to 3 mol per mol of the metal element with the largest mass ratio in the reducing agent 4R and the amount is more preferably from 1 to 2.5 mol.

The predetermined value in Condition II above is preferably from 50% to 100%, more preferably from 60% to 100%, and even more preferably from 70% to 100%. It should be noted that the upper limit of the predetermined value may be 95% or less or may be 90% or less.

In either case, it is possible to switch the reactors 4a and 4b before the conversion efficiency of carbon dioxide to carbon monoxide is extremely reduced, and as a result, it is possible to stably obtain the mixed gas containing a high concentration of carbon monoxide and thus to produce the purified gas containing a high concentration of carbon monoxide.

It should be noted that the amount Q of the supplied reducing gas (reducing substance) is preferably the amount of hydrogen from 1 to 3 mol per mol of the metal element with the largest mass ratio in the reducing agent 4R and the amount is more preferably from 0.15 to 2.5 mol. Even when the amount Q of the supplied reducing gas is increased above the upper limit, no further increase is expected in the effect of reducing the reducing agent 4R in the oxidized state. Meanwhile, when the amount Q of the supplied reducing gas is too small, depending on the amount of hydrogen contained in the reducing gas, the reduction of the reducing agent 4R is sometimes insufficient.

The pressure of the reducing gas to be supplied to the reactors 4a and 4b may be the atmospheric pressure or may be pressurized (similar extent to the first gas).

[11] The gases after passing through the reactors 4a and 4b then join for generation of the mixed gas. At this point, the mixed gas usually has a temperature from 600° C. to 650° C. The temperature of the mixed gas at this point within the above range means that the temperature in the reactors 4a and 4b is maintained at sufficiently high temperatures and the conversion of carbon dioxide to carbon monoxide by the reducing agent 4R and the reduction of the reducing agent 4R by the reducing gas are determined to efficiently proceed.

[12] The mixed gas is then cooled from 100° C. to 300° C. until reaching the gas purification section 9.

[13] The mixed gas then passes through the gas purification section 9. This causes, for example, the condensed water thus generated, carbon dioxide dissolved in the condensed water, and the like to be removed. As a result, carbon monoxide is purified from the mixed gas to obtain the purified gas containing a high concentration of carbon monoxide.

It should be noted that the purified gas thus obtained has a temperature from 20° C. to 50° C.

[14] The purified gas then passes through the purified gas heating section 15. The purified gas is thus heated. As described above, the purified gas during this operation preferably has a temperature from 500° C. to 1300° C.

[15] The purified gas is then returned to the blast furnace 200 via the purified gas emission section 40 and the return line 600.

The steel production system 100 thus allows steel production while efficiently reducing the carbon dioxide emissions.

Configuration of Reducing Agent Heating Section (Reducing Agent Temperature Regulation Section)

Figure 5:
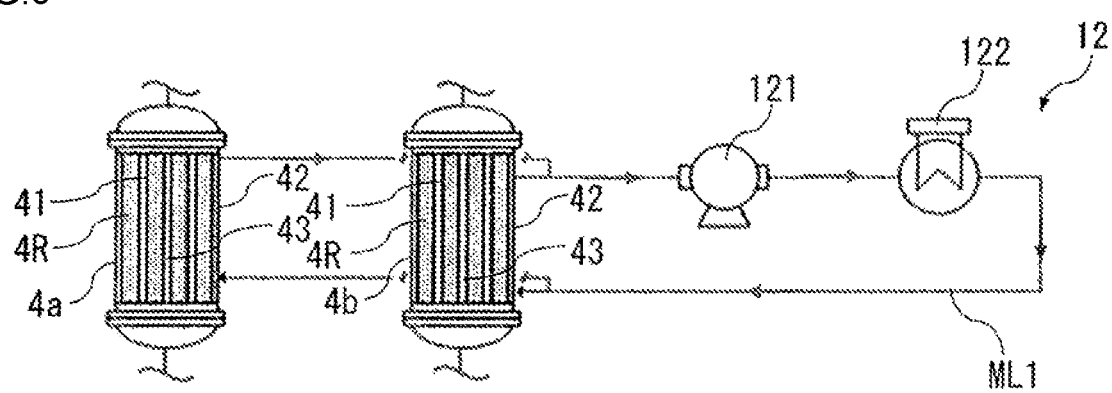
FIG. 5 is a schematic view illustrating a configuration of a reducing agent heating section.
Figure 6:
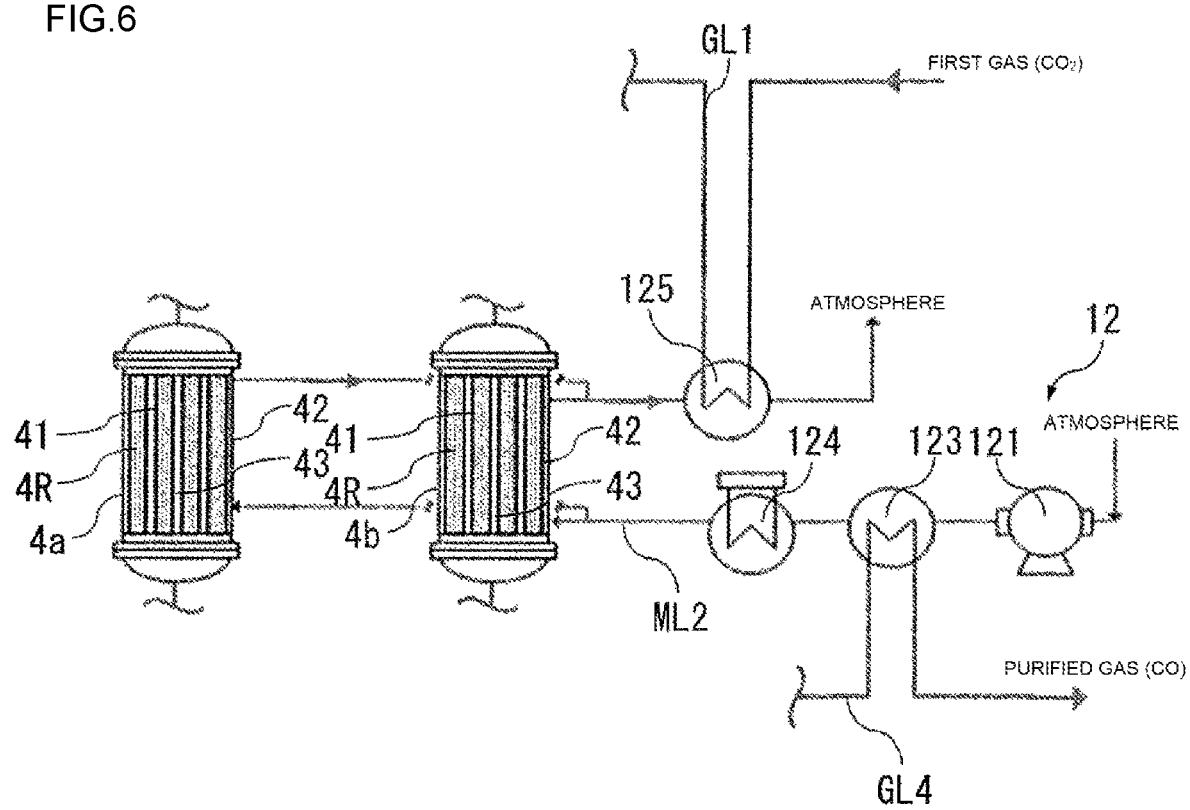
FIG. 6 is a schematic view illustrating another configuration of the reducing agent heating section.

FIG. 5 is a schematic view illustrating a configuration of the reducing agent heating section, and FIG. 6 is a schematic view illustrating another configuration of the reducing agent heating section.

A reducing agent heating section 12 illustrated in FIG. 5 includes: a medium to be supplied to a space 43 defined by the plurality of tubes 41 and the housing 42 each in the multitubular reactors 4a and 4b illustrated in FIG. 3; a transfer device 121 to transfer the medium to the spaces 43; and a heating device 122 to heat the medium.

The reducing agent heating section 12 in the present configuration example includes a circulating medium line ML1 connected to the respective reactors 4a and 4b, and the medium line ML1 is filled with the medium. The medium line ML1 is branched at one point and then connected to the respective reactors 4a and 4b, and then again joined to be one line. At some points on the medium line ML1 as one line, the transfer device 121 and the heating device 122 are arranged.

According to such a configuration, while circulating on the medium line ML1, the medium heated by the heating device 122 is supplied to the spaces 43 in the reactors 4a and 4b. The reducing agent 4R is thus indirectly heated via the tubes 41. It is also possible to set the heating temperatures of the reducing agent 4R approximately equal in the two reactors 4a and 4b.

The heating temperature of the reducing agent 4R is preferably from 300° C. to 700° C. and more preferably from 650° C. to 700° C. When the heating temperature is too high, the reducing agent 4R tends to be degraded and reduce its activity depending on the kind of metal oxide constituting the reducing agent 4R. In contrast, when the heating temperature is too low, the time taken for producing the purified gas containing a high concentration of carbon monoxide tends to be long.

Examples of the medium include gas, liquid (including viscous liquid), and the like.

The heating device 122 may be configured only with an electric heater or may be configured with an electric heater and a heat exchanger similar to those described in the feed gas heating section 10.

The latter configuration allows effective use of heat by using the heat of the gas at high temperatures after passing through the reactors 4a and 4b to heat the medium before supplied to the reactors 4a and 4b by heat exchange.

It should be noted that, in the case of using gas as the medium, the transfer device 121 may be configured with a fan. In the case of using liquid as the medium, the transfer device 121 may be configured with a pump.

It should be noted that the reducing agent heating section 12 may be configured with an electric heater instead of the configuration using the medium (heating gas). In this case, heating by the electric heater may be applied to the housings 42 of the reactors 4a and 4b or separately to the tubes 41 filled with the reducing agent 4R.

The reducing agent heating section 12 illustrated in FIG. 6 includes a non-circulating medium line ML2 and is configured to use the atmosphere (gas) as the medium.

In the present configuration example, in order from the atmosphere supply port side of the medium line ML2, the transfer device 121 (fan), a first heat exchanger 123, and a heating device 124 configured with an electric heater are arranged, and on the atmosphere emission port side, a second heat exchanger 125 is arranged.

Each of the first heat exchanger 123 and the second heat exchanger 125 preferably has a configuration similar to the heat exchanger 102.

The first heat exchanger 123 exchanges heat between the gas after passing through the tubes 41 of in the reactors 4a and 4b (e.g., mixed gas) and the atmosphere before supplied to the spaces 43 in the reactors 4a and 4b. Meanwhile, the second heat exchanger 125 exchanges heat between the atmosphere after passing through the spaces 43 in the reactors 4a and 4b and the first gas before supplied to the reactors 4a and 4b.

Using the heat of the gas or the atmosphere (medium) at high temperatures after passing through the reactors 4a and 4b, the atmosphere (medium) or the first gas before supplied to the reactors 4a and 4b is heated by heat exchange, thereby allowing effective use of heat.

It should be noted that, instead of the configuration of exchanging heat with the first gas before supplied to the reactors 4a and 4b, the second heat exchanger 125 may have a configuration of exchanging heat with the reducing gas before supplied to the reactors 4a and 4b or a configuration of exchanging heat with both the first gas and the reducing gas before supplied to the reactors 4a and 4b.

According to the configuration example illustrated in FIG. 6, the temperature of the medium to contact with the transfer device 121 is lower than the configuration example illustrated in FIG. 5 and thus there is an advantage of allowing a relatively inexpensive transfer device with low heat resistance to be used.

In this situation, use of a combustion furnace or the like to heat the reactors 4a and 4b (reducing agent 4R) causes fuel to be burned to maintain the heating temperature (reaction temperature) of the reducing agent 4R. Carbon dioxide is thus generated, causing carbon dioxide to be released into the atmosphere.

In contrast, the reducing agent heating section 12 configured as illustrated in FIGS. 5 and 6 allows use of the electric power (electrical energy) in the form of renewable energy as described above as the power source for the transfer device 121 and the heating devices 122 and 124, leading to reduction in the environmental load.

There is also an advantage of more secure reduction in the possibility of ignition on the flammable gas in the gas production apparatus 1.

It should be noted that, instead of the configurations illustrated in FIGS. 5 and 6, the reducing agent heating section may have a configuration of including a radiating device to irradiate the reducing agent 4R with microwaves.

The configuration of heating the reducing agent 4R by irradiation with microwaves allows heating of the reducing agent 4R to the target temperature in a relatively short time. In addition, this configuration facilitates heating not only around the surface of the reducing agent 4R but uniformly to the center. It further facilitates precise control of the heating temperature of the reducing agent 4R. Accordingly, use of the radiating device allows a more increase in the production efficiency of the purified gas. In addition, such a radiating device can be miniaturized compared with the configurations illustrated in FIGS. 5 and 6.

Irradiation with microwaves also allows only around the surface of the reducing agent 4R to be locally (preferentially) heated to the target temperature. When the reaction proceeds at high temperatures (in the case of endothermic reaction), the efficiency is easily increased. In this case, the energy may be input only to increase the temperature only around the surface of the reducing agent 4R and thus the energy efficiency is also improved.

The microwaves mean electromagnetic waves at frequencies from 300 MHz to 300 GHz and are classified into ultrahigh frequency (UHF) at frequencies from 300 to 3000 MHz, superhigh frequency (SHF) at frequencies from 3 to 30 GHz, extremely high frequency (EHF) at frequencies from 30 to 300 GHz, and submillimetric high frequency (SHF) at frequencies from 300 to 3000 GHz. Among all, the microwaves are preferably at the ultrahigh frequency (UHF). Use of the ultrahigh frequency (UHF) allows the reducing agent 4R to be heated to the target temperature in a short time.

It should be noted that the irradiation with microwaves is performed under appropriate measures for radio wave leakage in conformity with the Radio Law.

The irradiation with microwaves may be performed continuously or intermittently (pulse-like manner).

The present inventors have found that continuous irradiation with microwaves further increases the conversion efficiency of carbon dioxide to carbon monoxide and the recovery (reduction) efficiency of the reducing agent 4R by the reducing gas. Although the reasons are not fully clear, one of the factors is considered that the continuously radiated microwaves activate carbon dioxide contained in the first gas supplied to the reactors 4a and 4b, hydrogen contained in the reducing gas, and the reducing agent 4R.

Meanwhile, intermittent irradiation with microwaves allows an increase in the energy efficiency because microwaves may be radiated at predetermined timing to compensate the amount of energy only for the endothermic reaction during the conversion of carbon dioxide to carbon monoxide and recovery (reduction) of the reducing agent 4R by the reducing gas.

In the case of heating by irradiation with microwaves, the heating temperature of the first gas, the heating temperature of the reducing gas, and the heating temperature of the reducing agent 4R may be respectively in the same range as described above or may be in a range different from above. For example, each of the heating temperatures may be set from 300° C. to 700° C.

It should be noted that the radiating device may be arranged inside or outside the reactors 4a and 4b. As described above, as long as the gas composition of the first gas is deviated from the explosive range by the concentration regulation section 5, it is possible to preferably prevent from being an ignition source to the first gas regardless of the conditions of irradiation with microwaves.

In addition, since electrical energy is used as the power source for the radiating device, there is also an advantage of readily switching the electrical energy to renewable energy.

As described above, when the reaction by the reducing agent 4R is exothermic reaction, the reducing agent temperature regulation section may be configured as the reducing agent cooling section. In this case, in the configurations illustrated in FIGS. 5 and 6 for example, the first heat exchanger 123 and the second heat exchanger 125 may be omitted and the heating devices 122 and 124 may be changed into cooling systems. Examples of the cooling systems include jacket cooling systems, multitubular cooling systems, and the like. In this case as well, the cooling temperature (temperature after regulation) of the reducing agent 4R is preferably in the same range as above.

Configuration around Connection Section

Figure 7:
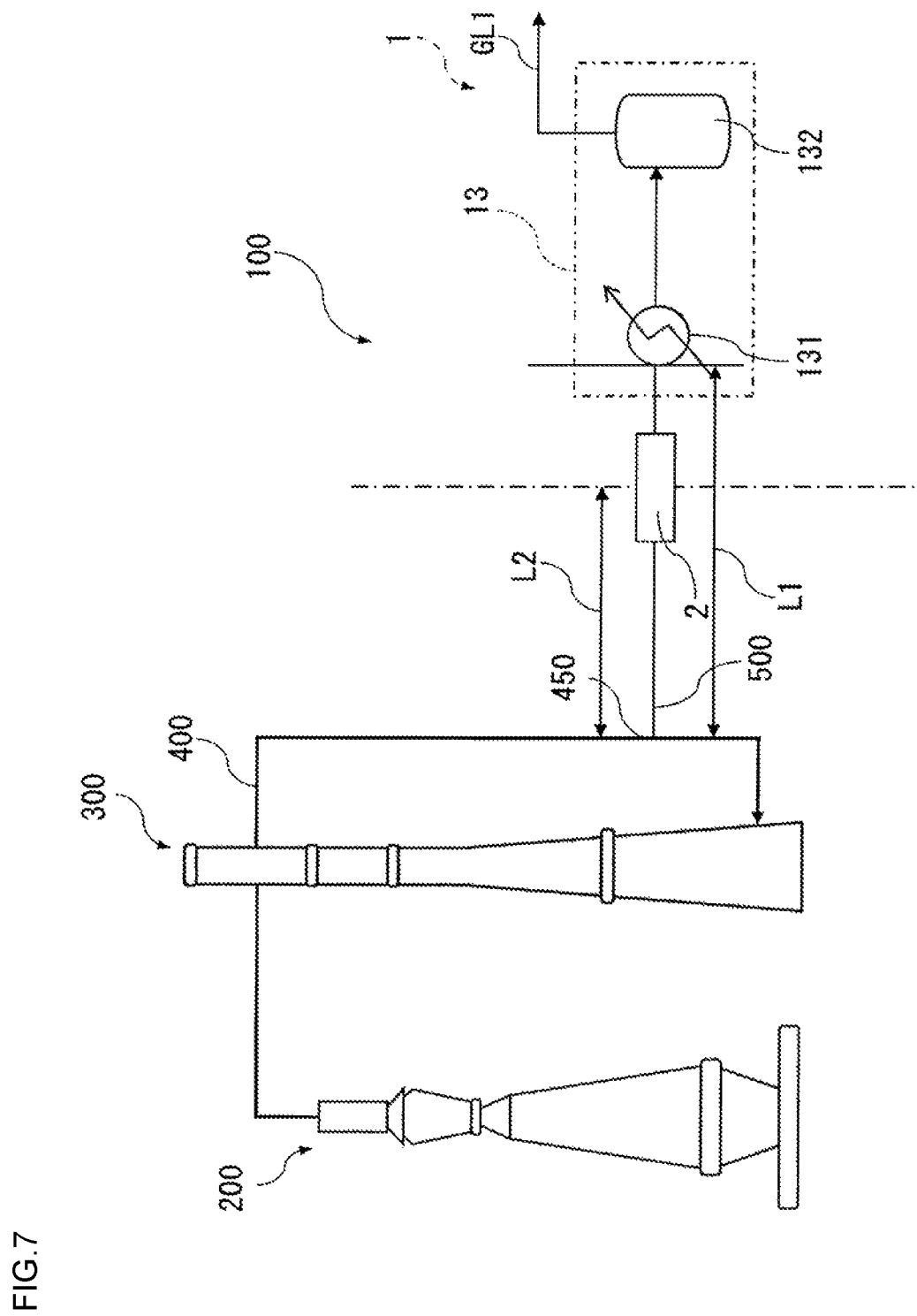
FIG. 7 is a schematic view illustrating a configuration of around a connection section between the gas production apparatus and exhaust gas equipment.

FIG. 7 is a schematic view illustrating the configuration around the connection section (raw material gas supply section) between the gas production apparatus and the exhaust gas equipment.

In the configuration illustrated in FIG. 7, a cooling section 13 is provided between the connection section 2 and the concentration regulation section 5. The cooling section 13 includes a cooling system 131 and a container 132 connected to the cooling system 131. The cooling system 131 may be configured with the jacket cooling system, the multitubular cooling system, or the like as described above.

Since the first gas supplied from the exhaust gas equipment contains not only steam but also oxidizing gas components ($SO_x$, HCl, etc.), it is preferred to condense steam together with the oxidizing gas components by cooling in the cooling section 13 to be removed as condensed water (acidic aqueous solution) in which the oxidizing gas components are dissolved. It is thus possible to preferably prevent corrosion of the piping configuring the gas line GL1.

In the present configuration example, the acidic aqueous solution is generated by cooling the first gas in the cooling system 131 and the acidic aqueous solution is stored in the container 132 to be separated from the first gas. On the gas-liquid interface in the container 132, a filter may be arranged to allow passage of gas but to block passage of liquid.

In such a configuration, the clearance between a branched portion 450 and the cooling system 131 (L1 in FIG. 7) is preferably, but not particularly limited to, 10 m or less and more preferably from 1 to 5 m. By setting the clearance L1 within the above range, it is possible to avoid generation of the condensed water (acidic aqueous solution) in which the acidic gases are dissolved in unintended areas of the gas line GL1 and more securely prevent corrosion of the piping configuring the gas line GL1.

In the case of installing the steel production system 100 in, for example, a cold district or the like, particularly depending on a clearance L2 between the branched portion 450 and the gas production apparatus 1, condensed water may be generated at some point in the supply line 500 and further leading to freezing. This may cause damage in the piping configuring the supply line 500.

To prevent such a trouble, the first gas in the supply line 500 is preferably heated. The heating temperature may be a temperature not to cause freezing and preferably an acid dew point temperature (e.g., 120° C.) or more and more preferably from 120° C. to 150° C. It is thus possible to preferably prevent corrosion of the piping due to the generation of condensed water in which acidic gases are dissolved while preventing damage in the piping configuring the supply line 500.

It should be noted that, to heat the first gas in the supply line 500, for example, a heating wire (heater) may be arranged by winding around the piping configuring the supply line 500. For anticorrosion purposes, resin lined piping configured with an anticorrosive resin material (e.g., fluorine-based resin material) or the like may be used without using a heater.

It should be noted that, in the present configuration example, the container 132 may be omitted as needed.

Use of the gas production apparatus 1 and the steel production system 100 as described above allow the purified gas (second gas) having carbon monoxide as a main component to be produced from the first gas containing carbon dioxide and to be used for steel production.

Steel Production Method

In a steel production method in the present embodiment, I: preparing a plurality of reactors 4a and 4b having a reducing agent 4R arranged therein, and a reducing gas containing hydrogen (reducing substance) to reduce the reducing agent 4R oxidized by contact with carbon dioxide, II: obtaining a first gas by converting carbon monoxide in a blast furnace gas (gas containing carbon dioxide and carbon monoxide) to carbon dioxide, III: converting the carbon dioxide to carbon monoxide by alternately contacting the first gas and the reducing gas with the reducing agent 4R in each of the reactors 4a and 4b, by switching the reactors 4a and 4b supplied with the first gas and the reducing gas to obtain a second gas having the carbon monoxide as a main component and also to reduce the oxidized reducing agent 4R, and IV: supplying the second gas emitted from the reactors 4a and 4b to a melting furnace 200.

Although the steel production system 100 (gas production apparatus 1) described above is configured to join the gases after passing through the reactors 4a and 4b immediately after passing through the reactors 4a and 4b, various treatments may be applied before joining. That is, at some point on the branched gas lines GL4a and GL4b, at least one treater may be provided for an arbitrary purpose.

The steel production system 100 with such a configuration is then described.

Figure 8:
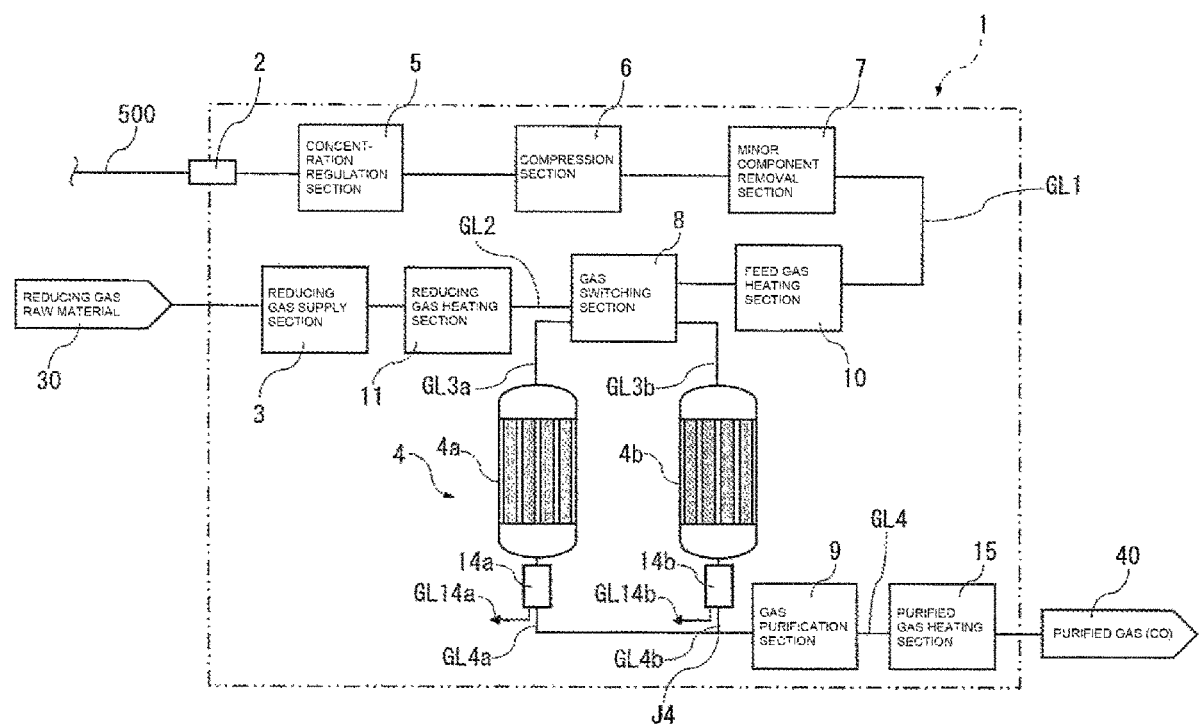
FIG. 8 is a schematic view illustrating another embodiment of the gas production apparatus in the steel production system of the present invention.
Figure 9:
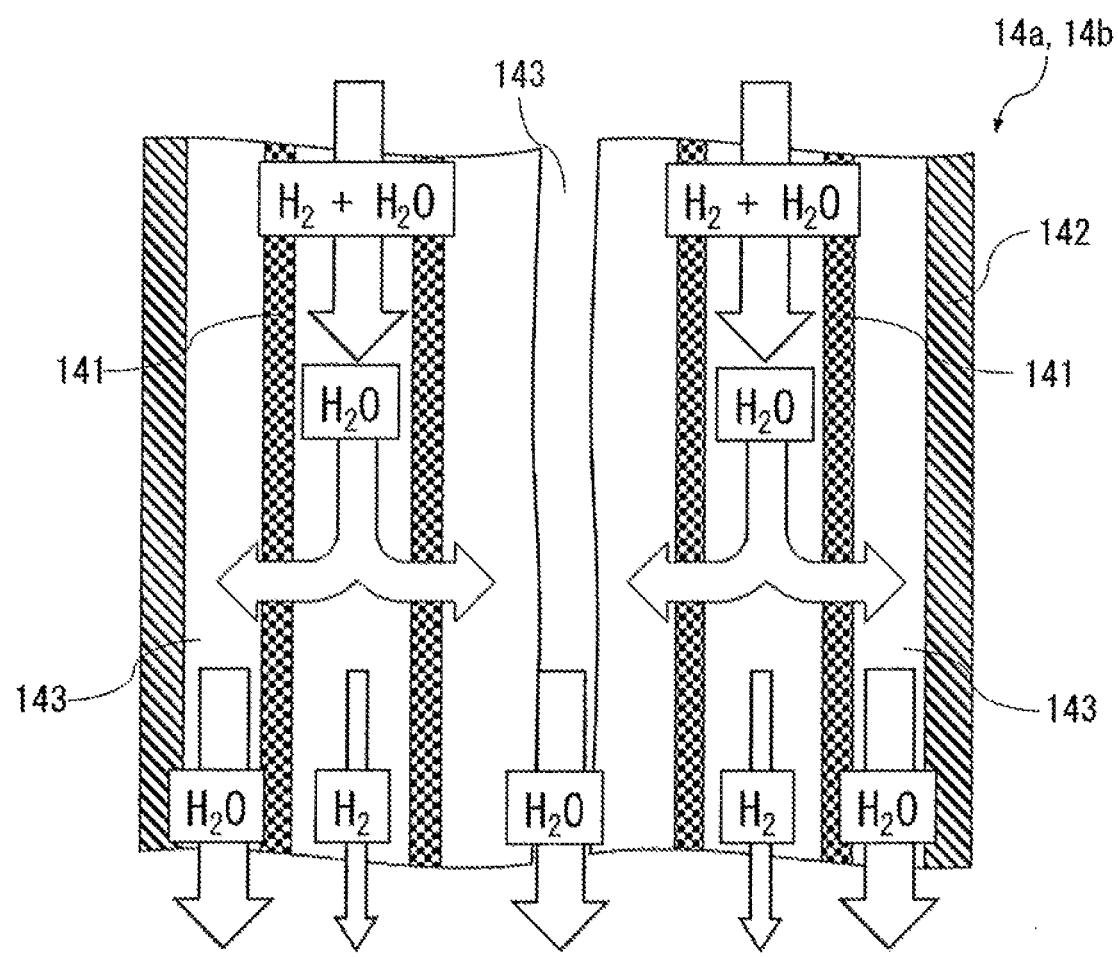
FIG. 9 is a cross-sectional view schematically illustrating a configuration of purifiers in FIG. 8.

FIG. 8 is a schematic view illustrating another embodiment of the gas production apparatus in the steel production system of the present invention, and FIG. 9 is a cross-sectional view schematically illustrating a configuration of purifiers in FIG. 8.

A description below is given to the gas production apparatus 1 illustrated in FIG. 8 mainly on the differences from the gas production apparatus 1 illustrated in FIG. 1 and the same descriptions are omitted.

The gas production apparatus 1 illustrated in FIG. 8 further includes purifiers 14a and 14b provided at respective points on the branched gas lines GL4a and GL4b. That is, the respective purifiers 14a and 14b are connected to a downstream side of the corresponding reactors 4a and 4b and the gases having sequentially passed through the reactors 4a and 4b and the purifiers 14a and 14b join at the gas joint section J4.

As illustrated in FIG. 9, each of the purifiers 14a and 14b is configured with a multitubular purification system including a plurality of separation tubes 141 and a housing (purifier body) 142 containing the plurality of separation tubes 141. According to such a multitubular purification system, it is possible to sufficiently secure an opportunity to contact the gases after passing through the reactors 4a and 4b with the separation tubes 141.

The respective purifiers 14a and 14b are preferably configured to be capable of at least one of separation between hydrogen (the reducing substance) and water (an oxide of the reducing substance) generated by contact with the reducing agent 4R and separation between the carbon monoxide and the carbon dioxide. In particular, each separation tube 141 is preferably configured to have a wall to cause water (steam) or carbon monoxide to permeate therethrough to be separated from hydrogen or carbon dioxide.

In the present embodiment, water and carbon monoxide after permeating through the separation tubes 141 are emitted from the purifiers 14a and 14b to the branched gas lines GL4a and GL4b. Meanwhile, the reducing gas (unreacted hydrogen) and the first gas (unreacted carbon dioxide) after passing through the separation tubes 141 are emitted to gas lines GL14a and GL14b connected to the housing 142 (space 143).

These gas lines GL14a and GL14b may be connected to respective points on the gas line GL1 and the gas line GL2. This allows reuse of unreacted hydrogen and carbon dioxide.

The gases emitted to the branched gas lines GL4a and GL4b may contain water or other gas components other than carbon monoxide and the gases emitted to the gas lines GL14a and GL14b may also contain other gas components other than hydrogen or carbon dioxide.

It should be noted that separation between carbon monoxide and carbon dioxide and separation between water and hydrogen may be performed respectively by cooling the gases emitted from the respective reactors 4a and 4b using the difference in the condensation (liquefying) temperature. In this case, however, to use the gas components after separation in a high temperature state on the downstream side of the reactors 4a and 4b (to return to the blast furnace 200 as in the present embodiment, etc.), the gases have to be heated again and causes waste of thermal energy. In contrast, since the purifiers 14a and 14b allow separation operation of the gas components at high temperatures (e.g., 200° C. to 500° C.), the temperature of the gas components after separation is less likely to decrease and thus this configuration contributes to thermal energy reduction in the entire production procedure of the purified gas.

It should be noted that, from the perspective of more securely preventing the decrease in the temperature of the gas components after separation by the purifiers 14a and 14b, a heating device to heat the separation tubes 141 may be provided (e.g., the above device for irradiation with microwaves, etc.).

As described above, the relatively high temperature gases are emitted from the respective reactors 4a and 4b. Accordingly, the separation tubes 141 are preferably heat resistant. It is thus possible to prevent alteration and degradation of the separation tubes 141.

Such a separation tube 141 is preferably composed of metal, inorganic oxide, or metal organic frameworks (MOF). In this case, excellent heat resistance is readily given to the separation tubes 141. In this context, examples of the metal include titanium, aluminum, copper, nickel, chromium, cobalt, alloys containing them, and the like. Examples of the inorganic oxide include silica, zeolite, and the like. Examples of the metal organic frameworks include frameworks of zinc nitrate hydrate with terephthalic acid dianion, frameworks of copper nitrate hydrate with trimesic acid trianion, and the like. In the case of using the metal, the separation tubes 141 are preferably composed of a porous material with a porosity of 80% or more.

The separation tubes 141 are preferably configured with a porous material containing continuous pores (pores penetrating the tube walls), which are adjacent pores in communication with each other. The separation tubes 141 thus configured are capable of increasing the permeability of water or carbon monoxide for more smooth and secure separation between water and hydrogen and/or separation between carbon monoxide and carbon dioxide.

The porosity of the separation tubes 141 is preferably, but not particularly limited to, from 5% to 95%, more preferably from 10% to 90%, and even more preferably from 20% to 60%. This allows the permeability of water or carbon monoxide to be maintained sufficiently high while preventing extreme reduction in the mechanical strength of the separation tubes 141.

It should be noted that the shape of the separation tubes 141 is not particularly limited and examples of the shape include cylindrical shapes, polygonal columnar shapes, such as a square column and hexagonal column, and the like.

From the perspective of improving the handleability of the gas after joining at the gas joint section J4 (preventing ignition) and maintaining the high production efficiency of the purified gas, it is effective to remove unreacted hydrogen.

That is, as illustrated in FIG. 9, a configuration is preferred in which, from hydrogen ($H_2$) and water ($H_2O$) after passing through the reactors 4a and 4b, water is moved into the space 143 in the housing 142 via the separation tubes 141.

In this case, the separation tubes 141 preferably have an average pore diameter of 600 pm or less and more preferably from 400 to 500 pm. This allows more improvement in the separation efficiency between water and hydrogen.

It should be noted that the space 143 in the housing 142 may be vacuumed or may allow a carrier gas (sweep gas) to pass through. Examples of the carrier gas include inert gas, such as helium and argon, and the like.

The separation tubes 141 are preferably hydrophilic. The separation tubes 141 with hydrophilicity increase the affinity of water for the separation tubes 141 and facilitate water to more smoothly permeate through the separation tubes 141.

Examples of the method for imparting hydrophilicity to the separation tubes 141 include: a method including changing the ratios of the metal elements in the inorganic oxide (e.g., increasing the Al/Si ratio, etc.) to improve the polarity of the separation tubes 141; a method including coating the separation tubes 141 with a hydrophilic polymer; a method including treating the separation tubes 141 with a coupling agent having a hydrophilic group (polar group); a method including applying plasma treatment, corona discharge treatment, or the like to the separation tubes 141, and the like.

Moreover, the affinity for water may be controlled by regulating the surface potential of the separation tubes 141.

In the separation tubes 141, when separation between carbon monoxide and carbon dioxide is preferentially performed and when both separation between water and hydrogen and separation between carbon monoxide and carbon dioxide are simultaneously performed, the component materials, the porosity, the average pore diameter, the degree of hydrophilicity or hydrophobicity, the surface potential, and the like of the separation tubes 141 may be appropriately set in combination.

It should be noted that the purifiers may be provided between the gas joint section J4 and the gas purification section 9 at some points on the gas line GL4.

When the purifiers 14a and 14b are provided, one or both of the gas purification section 9 and the purified gas heating section 15 may be omitted.

Although the system and method for producing steel of the present invention have been described above, the present invention is not limited to the description.

For example, based on the respective embodiments above, the steel production system of the present invention may have other optional and additional configurations or may be replaced by an arbitrary configuration exhibiting a similar function or may have omitted part from the configuration.

The steel production method of the present invention may have an additional procedure for an optional purpose based on the above embodiments.

The reactors 4a and 4b may be configured with, instead of the fixed-bed reactors, moving bed reactors. In this case, the two reactors 4a and 4b may be configured to be connected to each other in upper and lower portions to allow the reducing agent 4R to move (circulate) between the reactors 4a and 4b.

In this case, the gas line GL1 may be connected to the inlet port of one of the reactors 4a and 4b without being branched and the gas line GL2 may also be connected to the inlet port of the other of the reactors 4a and 4b without being branched.

In this case, one of the reactors 4a and 4b is configured with a vertical countercurrent reactor and the other is configured with a vertical co-current reactor. It should be noted that both reactors 4a and 4b may be configured with cross-current reactors.

Although the reducing gas in the above embodiments are described with a representative example of a gas containing hydrogen, a gas containing at least one selected from hydrocarbon (e.g., methane, ethane, acetylene, etc.) and ammonia instead of or together with hydrogen as a reducing substance may be used as the reducing gas.

Although the heat exchangers with a configuration to exchange heat between the first gas before supplied to the reactors, the reducing gas or the heating medium, and the mixed gas are described in the above embodiments, a heat exchanger with a configuration to with a gas emitted from each reactor before processed as the mixed gas may be employed.

REFERENCE SIGNS LIST

100 Steel Production System
200 Blast Furnace
300 Smokestack
400 Gas Line
410 First Gas Generating Section, 420 Concentration Section, 450 Branched Portion
500 Supply Line
600 Return Line
1 Gas Production Apparatus
2 Connection Section
3 Reducing Gas Supply Section
4 Reaction Section
4a, 4b Reactor
41 Tube, 42 Housing, 43 Space, 44 Partition Wall, 4R Reducing Agent
5 Concentration Regulation Section
6 Compression Section
7 Minor Component Removal Section
8 Gas Switching Section
9 Gas Purification Section
10 Feed Gas Heating Section
101 Electric Heater, 102 Heat Exchanger
11 Reducing Gas Heating Section
12 Reducing Agent Heating Section
121 Transfer Device, 122 Heating Device, 123 First Heat Exchanger, 124 Electric Heater, 125 Second Heat Exchanger
13 Cooling Section
131 Cooling System, 132 Container
14a, 14b Purifier
141 Separation Tube, 142 Housing, 143 Space
15 Purified Gas Heating Section
30 Tank
40 Purified Gas Emission Section
GL1 Gas Line
GL2 Gas Line
GL3a, GL3b Gas Line
GL4 Gas Line
GL4a, GL4b Branched Gas Line, J4 Gas Joint Section
GL14a, GL14b Gas Line
L1 Clearance
L2 Clearance

The invention claimed is:

1. A steel production system comprising:
 a first gas generating section comprising a combustion furnace,
  wherein the combustion furnace is configured to burn a gas containing carbon dioxide and carbon monoxide to obtain a first gas by converting the carbon monoxide in the gas to carbon dioxide;
 a deoxidization device configured to remove oxygen contained in the first gas;
 a reducing gas supply section configured to supply a reducing gas containing a reducing substance, wherein the reducing substance reduces a reducing agent that contains a metal oxide,
wherein the metal oxide reduces carbon dioxide and is oxidized by contact with the carbon dioxide;
a reaction section including a plurality of reactors that are respectively connected to at least one of the deoxidization device and the reducing gas supply section,
wherein the reducing agent is arranged in each of the plurality of reactors,
wherein the reaction section is capable of switching between the first gas from which the oxygen has been removed and the reducing gas supplied to each of the plurality of reactors or capable of transferring the reducing agent between the plurality of reactors;
a compression section configured to increase pressure of the first gas from which the oxygen has been removed before being supplied to the plurality of reactors; and
a return line configured to supply a second gas from the reaction section to a melting furnace, the second gas being obtained by contacting the first gas from which the oxygen has been removed supplied to the plurality of reactors with the reducing agent to convert the carbon dioxide to carbon monoxide and the second gas having the carbon monoxide as a main component.

2. The steel production system according to claim 1, wherein the first gas generating section is operatively connected to the melting furnace, which is in a steelworks or a refinery such that exhausts gas from the steelworks or the refinery is supplied to the first gas generating section as the gas.

3. The steel production system according to claim 1, further comprising a concentration section arranged between the first gas generating section and the reaction section,
wherein the concentration section comprises the deoxidization device, which is configured to increase a concentration of the carbon dioxide contained in the first gas.

4. The steel production system according to claim 3, wherein the deoxidization device in the concentration section is configured to increase the concentration of the carbon dioxide contained in the first gas such that gas emitted from the concentration section is 70 volume % or more based on a total of the first gas.

5. The steel production system according to claim 1, wherein the second gas is obtained by contacting the first gas from which the oxygen has been removed supplied to the plurality of reactors with the reducing agent to convert the carbon dioxide to carbon monoxide such that a concentration of the carbon monoxide contained in the second gas is 70 volume % or more based on a total of the second gas.

6. The steel production system according to claim 1, further comprising a second gas heating section configured to heat the second gas before supplied to the melting furnace.

7. The steel production system according to claim 6, wherein the second gas heating section is configured to heat the second gas such that the second gas after being heated by the second gas heating section has a temperature from 500° C. to 1300° C.

8. The steel production system according to claim 1, further comprising a first gas heating section configured to heat the first gas from which the oxygen has been removed before the first gas from which the oxygen has been removed is supplied to the plurality of reactors.

9. The steel production system according to claim 1, further comprising a reducing gas heating section configured to heat the reducing gas before the reducing gas is supplied to the plurality of reactors.

10. The steel production system according to claim 1, wherein the system is configured to supply the first gas from which the oxygen has been removed to the plurality of reactors such that a relationship of |X−Y| of 0 to 25 is satisfied,
wherein $X[° C.]$ is a temperature at which the first gas from which the oxygen has been removed is supplied to the plurality of reactors, and
wherein $Y[° C.]$ is a temperature at which the reducing gas is supplied to the plurality of reactors.

11. The steel production system according to claim 1, further comprising a reducing agent temperature regulation section configured to regulate a temperature of the reducing agent during contact of the first gas from which the oxygen has been removed or the reducing gas with the reducing agent.

12. The steel production system according to claim 1, wherein the reducing gas contains hydrogen as the reducing substance, and
the reducing gas supply section includes a hydrogen generator configured to generate the hydrogen by electrolysis of water or to generate by-product hydrogen as the hydrogen.

13. The steel production system according to claim 1, wherein the metal oxide contains at least one metal selected from metal elements belonging to the third through twelfth groups of the Periodic Table of Elements.

14. The steel production system according to claim 1, further comprising a purifier connected to a downstream side of each of the plurality of reactors, wherein
the purifier includes: a purifier body; and a separation tube arranged in the purifier body and capable of at least one of separation between the reducing substance and an oxide of the reducing substance generated by contact with the reducing agent and separation between the carbon monoxide and the carbon dioxide.

* * * * *